US008035921B2

(12) United States Patent
Sunwoo

(10) Patent No.: US 8,035,921 B2
(45) Date of Patent: Oct. 11, 2011

(54) PERPENDICULAR MAGNETIC RECORDING HEAD AND METHOD FOR MANUFACTURING THE SAME

(75) Inventor: Kook-hyun Sunwoo, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 931 days.

(21) Appl. No.: 12/018,939

(22) Filed: Jan. 24, 2008

(65) Prior Publication Data
US 2009/0015965 A1  Jan. 15, 2009

(30) Foreign Application Priority Data

Jul. 11, 2007 (KR) .................. 10-2007-0069832

(51) Int. Cl.
*G11B 5/127* (2006.01)
(52) U.S. Cl. ............................... 360/123.05; 29/603.24
(58) Field of Classification Search .................. 360/110, 360/123.01, 123.02, 123.03, 123.05, 123.06, 360/123.1; 29/603.23, 603.24, 603.25
See application file for complete search history.

(56) References Cited

U.S. PATENT DOCUMENTS

| 3,824,618 A * | 7/1974 | Murai .............................. 360/22 |
| 4,748,525 A * | 5/1988 | Perlov ........................... 360/110 |
| 5,293,031 A * | 3/1994 | Goto et al. .................... 235/449 |
| 5,936,814 A * | 8/1999 | Slade et al. ................ 360/125.4 |
| 6,400,526 B2 * | 6/2002 | Crue et al. ................ 360/125.44 |
| 6,754,049 B1 * | 6/2004 | Seagle et al. .................. 360/317 |
| 7,079,355 B2 * | 7/2006 | Hsiao et al. ............. 360/125.62 |
| 7,102,854 B2 * | 9/2006 | Wang et al. ............... 360/125.5 |
| 7,193,815 B1 * | 3/2007 | Stoev et al. ............ 360/125.12 |
| 7,564,236 B1 * | 7/2009 | Call et al. ....................... 324/210 |
| 2005/0128637 A1 * | 6/2005 | Johnston et al. ............. 360/125 |
| 2006/0176601 A1 * | 8/2006 | Amin et al. ..................... 360/66 |
| 2008/0112080 A1 * | 5/2008 | Lengsfield et al. ...... 360/125.04 |

FOREIGN PATENT DOCUMENTS

JP 11-328617 A 11/1999
KR 10-2006-0100831 A 9/2006

* cited by examiner

*Primary Examiner* — Angel A. Castro
(74) *Attorney, Agent, or Firm* — Sughrue Mion, PLLC

(57) ABSTRACT

A perpendicular magnetic recording head includes a main pole, a return yoke forming a magnetic path with the main pole, and a coil encompassing the main pole in a solenoid structure to allow the main pole to generate a magnetic field that records information on a recording medium is provided. When a side of the main pole toward the return yoke is an upper portion of the main pole and a side of the main pole opposite to the return yoke is a lower portion of the main pole, the coil includes a lower wire portion passing through the lower portion of the main pole, an upper wire portion passing through the upper portion of the main pole, and a connection portion electrically connecting the lower wire portion and the upper wire portion, and the upper wire portion includes an upper wire layer having at least two layers. The structure may improve a high frequency recording characteristics required for achieving a high recording density.

21 Claims, 15 Drawing Sheets

PERPENDICULAR MAGNETIC RECORDING HEAD AND METHOD FOR MANUFACTURING THE SAME

CROSS-REFERENCE TO RELATED PATENT APPLICATIONS

This application claims priority from Korean Patent Application No. 10-2007-0069832, filed on Jul. 11, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to a perpendicular magnetic recording head and a manufacturing method thereof, and more particularly, to a perpendicular magnetic recording head having a solenoid type coil structure in which a coil, which generates a recording magnetic field, is formed at a main pole to increase a recording density of a recording medium by improving the strength of the recording magnetic field.

2. Description of the Related Art

Magnetic recording methods can be divided into horizontal magnetic recording methods and perpendicular magnetic recording methods. In a horizontal magnetic recording method, information is recorded based on the fact that the magnetization direction of a magnetic layer is parallel to the surface of the magnetic layer. In a perpendicular magnetic recording method, information is recorded based on the fact that the magnetization direction of a magnetic layer is perpendicular to the surface of the magnetic layer. In terms of recording density, a perpendicular magnetic recording method is superior to a horizontal magnetic recording method. As such, perpendicular magnetic recording heads having various structures are being developed.

To achieve high linear recording density with perpendicular magnetic recording heads, high frequency recording characteristics need to be improved through optimal design of a recording head. To improve the high frequency recording characteristics means maintaining a strong recording magnetic field at a high frequency while simultaneously shortening rise time of the recording magnetic field. For fast rise time of a recording magnetic field, it is important to decrease head inductance and eddy current loss.

The eddy current loss can be decreased by using a material having a high resistivity as a main pole of the recording head. However, since the characteristics of the main pole are determined by various factors, such as saturation magnetization and coercivity, in addition to the resistivity, it is difficult to increase the resistivity of the main pole without affecting other factors.

SUMMARY OF THE INVENTION

To address the above and/or other aspects, the present invention provides a perpendicular magnetic recording head having a solenoid type coil structure and improved high frequency recording characteristics without a decrease in the strength of a recording magnetic field.

According to an aspect of the present invention, there is provided a perpendicular magnetic recording head that comprises: a main pole, a return yoke forming a magnetic path with the main pole, and a coil encompassing the main pole in a solenoid structure to allow the main pole to generate a magnetic field, which records information on a recording medium, wherein, when a side of the main pole toward the return yoke is an upper portion of the main pole and a side of the main pole opposite to the return yoke is a lower portion of the main pole. The coil includes a lower wire portion passing through the lower portion of the main pole, an upper wire portion passing through the upper portion of the main pole, and a connection portion electrically connecting the lower wire portion and the upper wire portion, and the upper wire portion includes an upper wire layer having at least two layers.

According to another aspect of the present invention, a method of manufacturing a perpendicular magnetic recording head including a coil encompassing a main pole in a solenoid type structure comprises forming a lower wire portion and a connection portion above a magnetic shield layer, forming a first magnetic layer having a main pole on the lower wire portion, forming a first insulation layer on the first magnetic layer, and forming an upper wire portion, which includes a first upper wire portion and a second upper wire portion formed in an upper portion of the first upper wire portion, on the first insulation layer.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Figure 1:
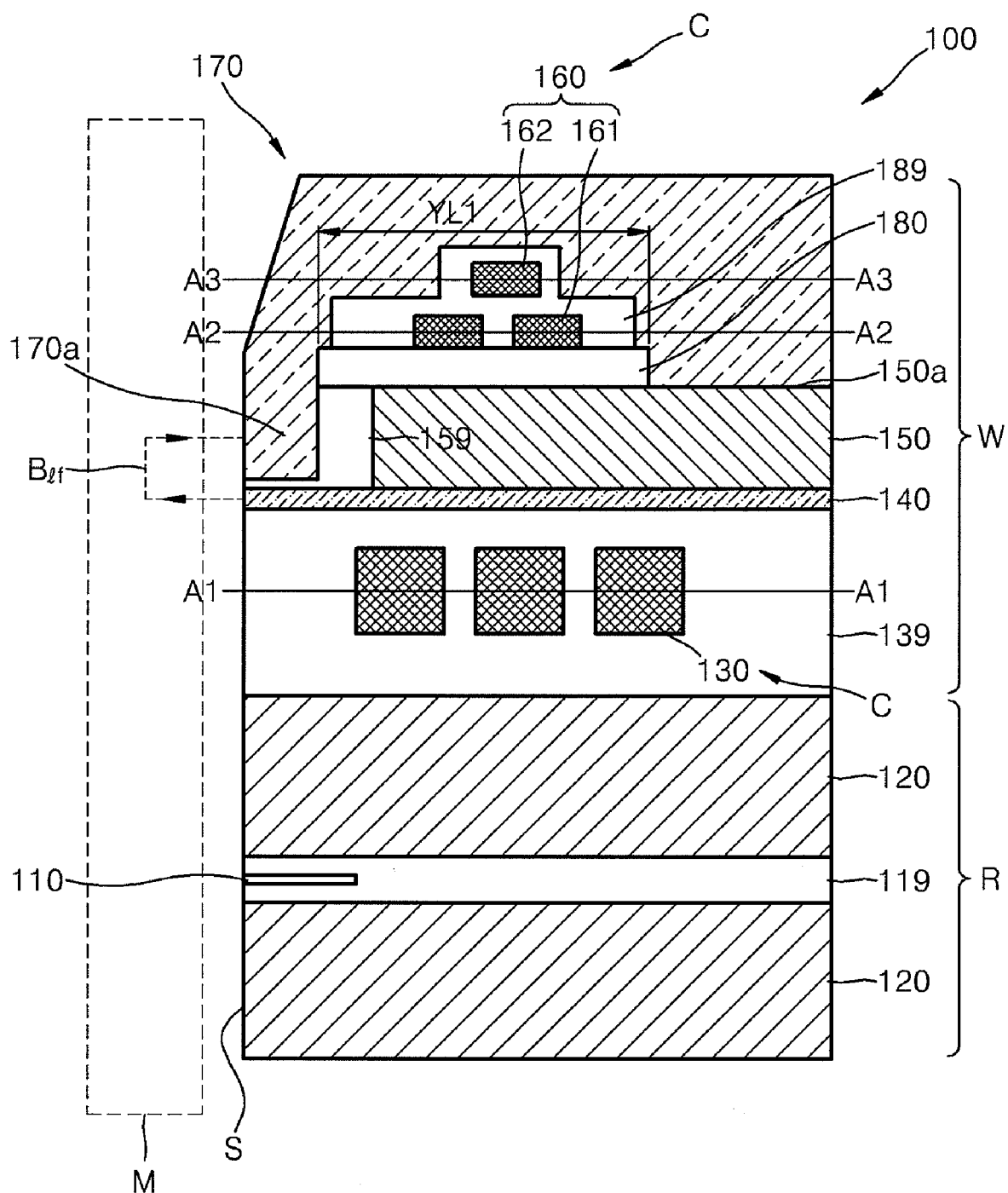
FIG. 1 is a cross-sectional view showing the structure of a perpendicular magnetic recording head according to an exemplary embodiment of the present invention.

The attached drawings of exemplary embodiments of the present invention are referred to in order to gain an understanding of the present invention, the merits thereof, and the objectives which maybe accomplished by the implementation of the present invention. Hereinafter, the present invention will be described in detail by explaining exemplary embodiments of the invention with reference to the attached drawings. Like reference numerals in the drawings denote like elements. The size of each constituent element shown in the drawings are exaggerated for clarity and convenience of explanation.

Figure 2A:
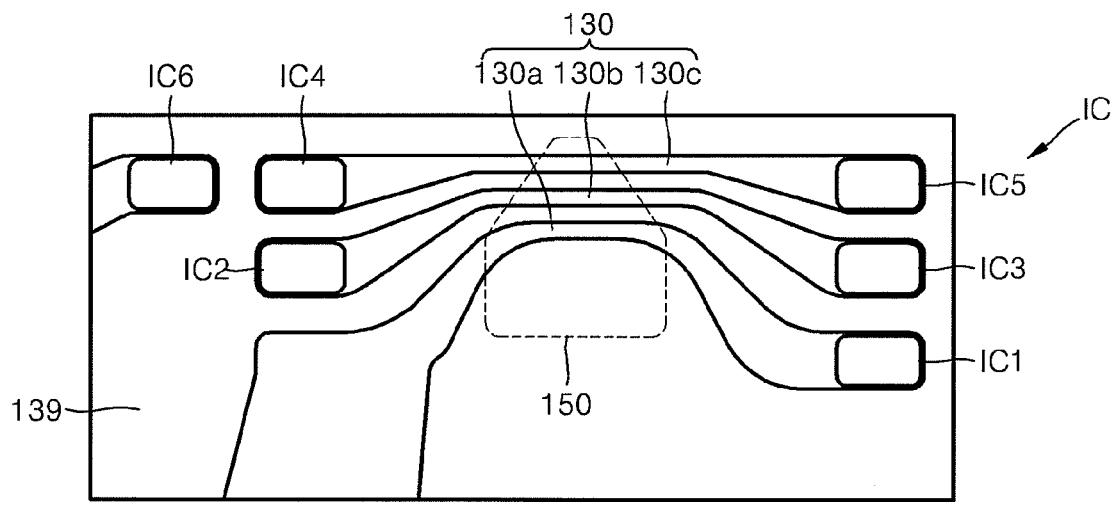
FIGS. 2A-2C are cross-sectional views showing the wiring structure of the perpendicular magnetic recording head of FIG. 1.
Figure 2B:
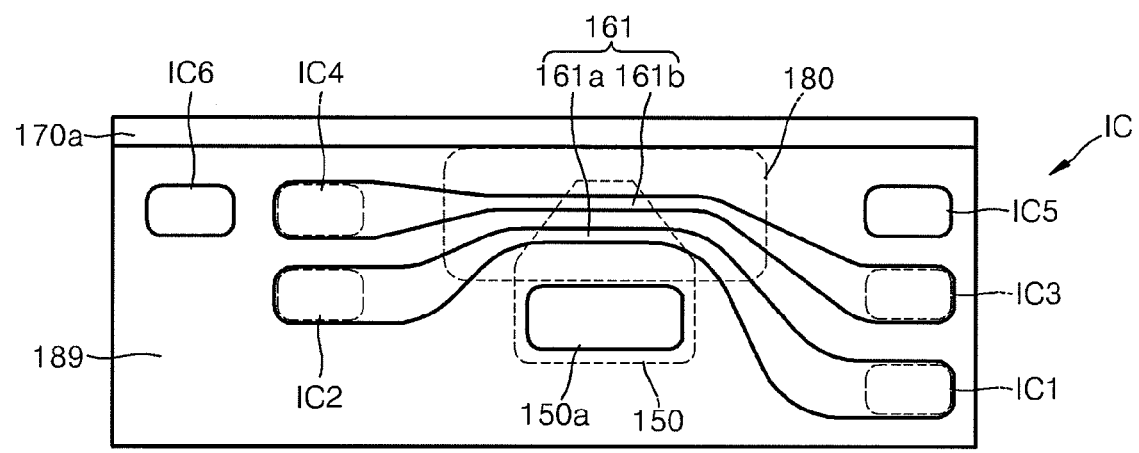
Figure 2C:
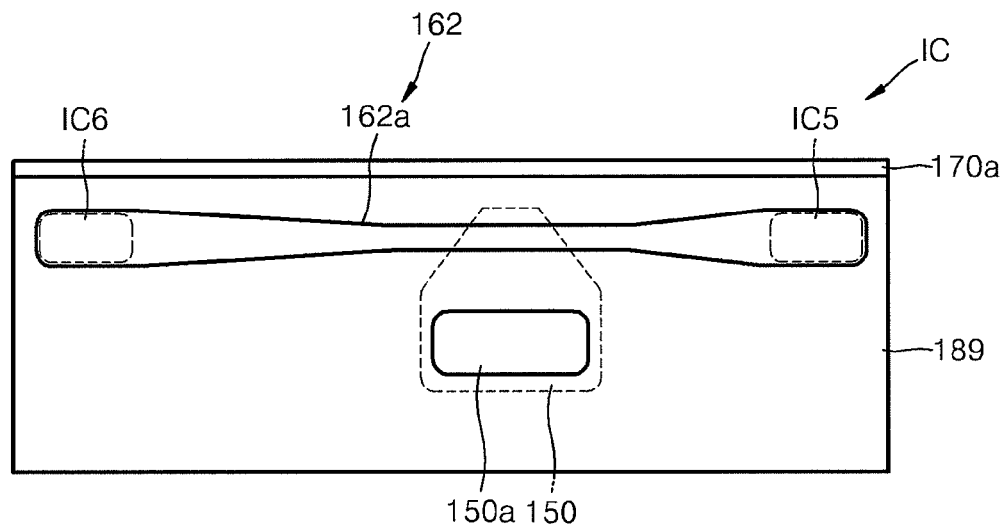

FIG. 1 is a cross-sectional view showing the structure of a perpendicular magnetic recording head 100 according to an exemplary embodiment of the present invention. FIGS. 2A-2C are cross-sectional views showing the wiring structure of the perpendicular magnetic recording head 100 of FIG. 1.

Referring to FIGS. 1 and 2A-2C, to record information on a recording medium M, the perpendicular magnetic recording head 100 includes a write head portion W which includes a main pole 140 that emits a magnetic field toward the recording medium M, a solenoid type coil C to which current for generating an induced magnetic field is applied, and a return yoke 170 forming a magnetic path of the magnetic field with the main pole 140. The write head portion W may include a sub-yoke 150 to help magnetic flux condense at an end tip of the main pole 140 toward the recording medium M. To read information recorded on the recording medium M, the perpendicular magnetic recording head 100 may further include a read head portion R comprising a pair of magnetic shield layers 120 and a magneto-resistance device 110 interposed between the magnetic shield layers 120. The perpendicular magnetic recording head 100 further includes insulation layers 119, 139, 159, 180, and 189 that are formed of, for example, $Al_2O_3$ or other insulation materials. The perpendicular magnetic recording head 100 has a surface S facing the recording medium M (hereinafter, referred to as an air bearing surface S). For convenience of explanation, it is assumed that a side of the main pole 140 facing the return yoke 170 is an upper portion of the main pole 140 while the other side of the main pole 140 opposite to the return yoke 170 is a lower portion of the main pole 150.

The main pole 140, the return yoke 170, and the sub-yoke 150 are respectively formed of a magnetic material to form a magnetic path of a recording magnetic field generated by a coil C. The amount of magnetic field condensed at the end tip of the main pole 140 toward the air bearing surface S is limited by the saturation flux density of the main pole 140, which is formed of a magnetic material having a saturation flux density greater than that of the return yoke 170 or the sub-yoke 150. For example, the main pole 140 can be formed of NiFe, CoFe, or CoNiFe. The sub-yoke 150 or the return yoke 170 may have a higher magnetic permeability than that of the main pole 140 in order to have a fast response characteristic with respect to high frequency changes in the magnetic field. A magnetic material such as NiFe, for example, can be used for the sub-yoke 150 or the return yoke 170 and the saturation flux density and the magnetic permeability are appropriately designed by adjusting the component ratios of Ni and Fe.

A return yoke tip 170a, which is an end portion of the return yoke 170 at part of the air bearing surface S, is separated from the main pole 140. A gap between the return yoke tip 170a and the main pole 140 is formed to create a return path after a leakage flux $B_{lf}$ generated by the main pole 140 magnetizes the recording medium M in a vertical direction. For example, the width of the gap may not be more than several hundreds of nanometers. The sub-yoke 150 can be further provided on an upper surface of the main pole 140. The sub-yoke 150 is separated a predetermined distance from the air bearing surface S so that a magnetic field is condensed at the end portion of the main pole 140 toward the air bearing surface S. The sub-yoke 150 and the return yoke 170 are magnetically connected on a side far from the air bearing surface S. That is, the sub-yoke 150 and the return yoke 170 are magnetically combined through a back gap 150a.

FIGS. 1 and 2A-2C illustrate a case in which the coil of the present exemplary embodiment has a solenoid structure. FIG. 2A is a cross-sectional view taken along line A1-A1 of the perpendicular magnetic recording head 100 of FIG. 1. FIG. 2B is a cross-sectional view taken along line A2-A2 of the perpendicular magnetic recording head 100 of FIG. 1. FIG. 2C is a cross-sectional view taken along line A3-A3 of the perpendicular magnetic recording head 100 of FIG. 1.

Referring to FIGS. 1 and 2A-2C, the coil C includes a lower wire portion 130 of a single layer structure passing under the main pole 140, an upper wire portion 160 of a double layer structure passing above the main pole 140, and connection portion IC electrically connecting the lower wire portion 130 and the upper wire portion 160. The lower wire portion 130, the upper wire portion 160, and the connection portion IC make the solenoid structure by encompassing the main pole 140 and the sub-yoke 150. The lower wire portion 130 includes first through third lower wires 130a, 130b, and 130c. The upper wire portion 160 includes a first upper wire layer 161 and a second upper wire layer 162. The first upper wire layer 161 includes first and second upper wires 161a and 161b and is closer to the main pole 140 than the second upper wire layer 162. The second upper wire layer 162 includes a third upper wire 162a and is farther from the main pole 140 than the first upper wire layer. The connection portion IC includes a first through sixth connection IC1~IC6. The lower wire portion 130, which is not related to a yoke length YL1, has a single layer structure while the upper wire portion 160, which is related to a yoke length YL1, has a double layer structure. Thus, by decreasing the yoke length YL1, more number of turns can be achieved.

Also, the yoke length YL1 can be further decreased by making the cross-sectional areas of the first through third upper wires 161a, 161b, and 162a less than that of the first through third lower wires 130a, 130b, and 130c. The increase in resistance of the first through third upper wires 161a, 161b, and 162a caused by the decrease in the cross-sectional areas of the first through third upper wires 161a, 161b, and 162a can be offset by increasing the cross-sectional areas of the first through third lower wires 130a, 130b, and 130c. The yoke length YL1 signifies a distance from the end of third insulation layer 180 on the side of the air bearing surface S to the end of the third insulation layer 180 on the side of the back gap 150a. The third insulation layer 180 electrically insulates the sub-yoke 150 from the upper wire portion 160. The yoke length YL1 corresponds to the length of the insulating layer 180 as seen from a cross-sectional view perpendicular to the air bearing surface S. Furthermore, the second upper wire layer 162 is preferably arranged in the middle, above the first upper wire layer 161 to decrease the length of a magnetic path formed by the main pole 140, the sub-yoke 150, and the return yoke 170 and to simultaneously prevent the degradation of the characteristics of a magnetic flux flowing in the return yoke 170, which is a magnetic film placed on the upper wire portion 160 due to a sharp inclination or step.

Further, as shown in FIGS. 2B and 2C, the width of middle portions of the first through third upper wires 161a, 161b, and 162a passing above the main pole 140 may be smaller than that of the outer portions of the first through third upper wires 161a, 161b, and 162a passing above the main pole 140. In this form, the yoke length YL1 can be further decreased and the upper wire portion 160 can be arranged closer to the air bearing surface S. For example, when the upper wire portion 160 is formed with two layers, as in the present exemplary embodiment, the upper wire portion 160 of a three-turn solenoid coil C can be arranged within about 5 μm from the air bearing surface S using a conventional photolithography technique. Also, as shown in FIG. 2A, the width of middle portions of the first through third lower wires 130a, 130b, and 130c passing under the main pole 140 may be smaller than that of outer portions of the first through third lower wires 130a, 130b, and 130c passing under the main pole 140. Thus, as the upper wire portion 160 and the lower wire portion 130 are arranged in an area close to the end tip of the main pole 140 toward the air bearing surface S, a magnetic flux is concentrated at the end tip of the main pole 140 so that a recording efficiency is improved.

When the cross-sectional area of the upper wire portion 160 or the lower wire portion 130 is reduced to decrease the yoke length YL1 and the coil C is mainly arranged at the side of the air bearing surface S, the resistance of the coil C can be increased. Such increased resistance can be offset by increasing the pad areas of the connection portion IC. Thus, the cross-sectional areas of the first through sixth connections IC1-IC6 are preferably, but not necessarily, larger, and more preferably twice or more, than that of a wire of the upper wire portion 160 or the lower wire portion 130. The cross-sectional areas of the first through sixth connections IC1-IC6 signify a cross-sectional area as viewed from a plane where the upper wire portion 160 or the lower wire portion 130 is placed, as shown in FIGS. 2A-2C.

Then, referring to FIGS. 2A-2C, in the electrical connection structure of the coil of the present exemplary embodiment, an end of the first lower wire 130a of the lower wire portion 130 is connected to a first input port (not shown) and the other end of the first lower wire 130a is connected to an end of the first upper wire 161a of the first upper wire layer 161 through the first connection IC1. The other end of the first upper wire 161a is connected to an end of the second lower wire 130b through the second connection IC2. The other end of the second lower wire 130b is connected to an end of the second upper wire 161b through the third connection IC3. The other end of the second upper wire 161b is connected to an end of the third lower wire 130c through the fourth connection IC4. The other end of the third lower wire 130c is connected to an end of the third upper wire 162a of the second upper wire layer 162 through the fifth connection IC5. The other end of the third upper wire 162a connects down to the lower wire portion 130 through the sixth connection IC6. The sixth connection IC6 is connected to a second input port (not shown) in the layer where the first lower wire 130a is placed.

Figure 3:
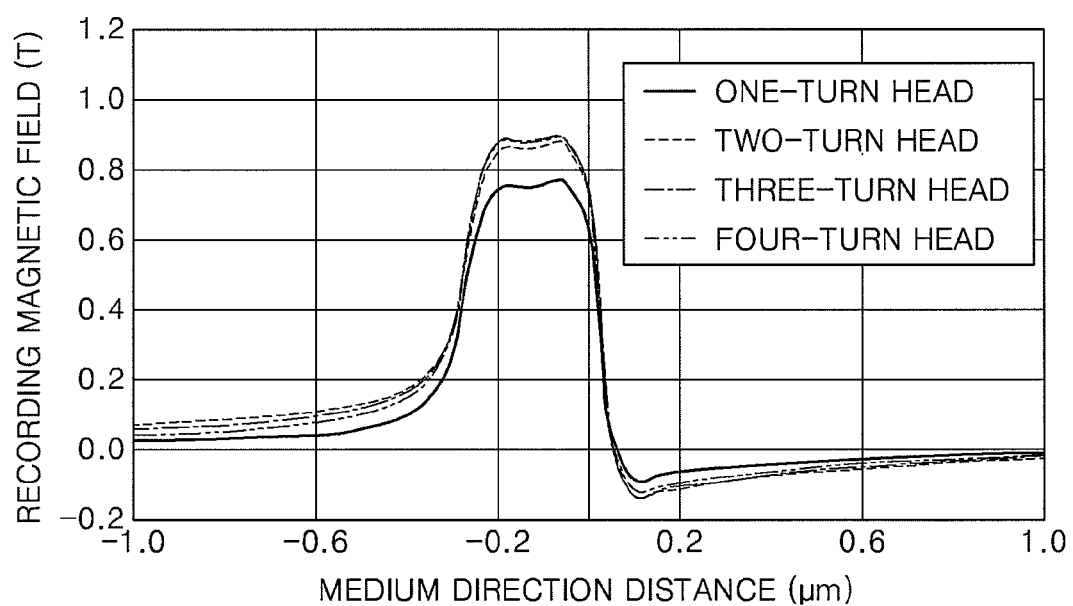
FIG. 3 is a graph showing the strength of a recording magnetic field according to the number of coil windings.

In the present exemplary embodiment, a sufficient strength of the recording magnetic field is obtained by employing a solenoid type coil. FIG. 3 is a graph showing the strength of a recording magnetic field according to the number of coil turns in a recording head having a solenoid type coil. In the solenoid type coil as shown in FIG. 3, the strength of a recording magnetic field is slightly low at one turn but the strengths of a recording magnetic field are relatively high with little difference from each other at two or more turns. It can be seen that sufficient strength of a recording magnetic field can be obtained in a three-turn coil as in the present exemplary embodiment or a two-turn coil as in an exemplary embodiment that is described later.

Figure 4:
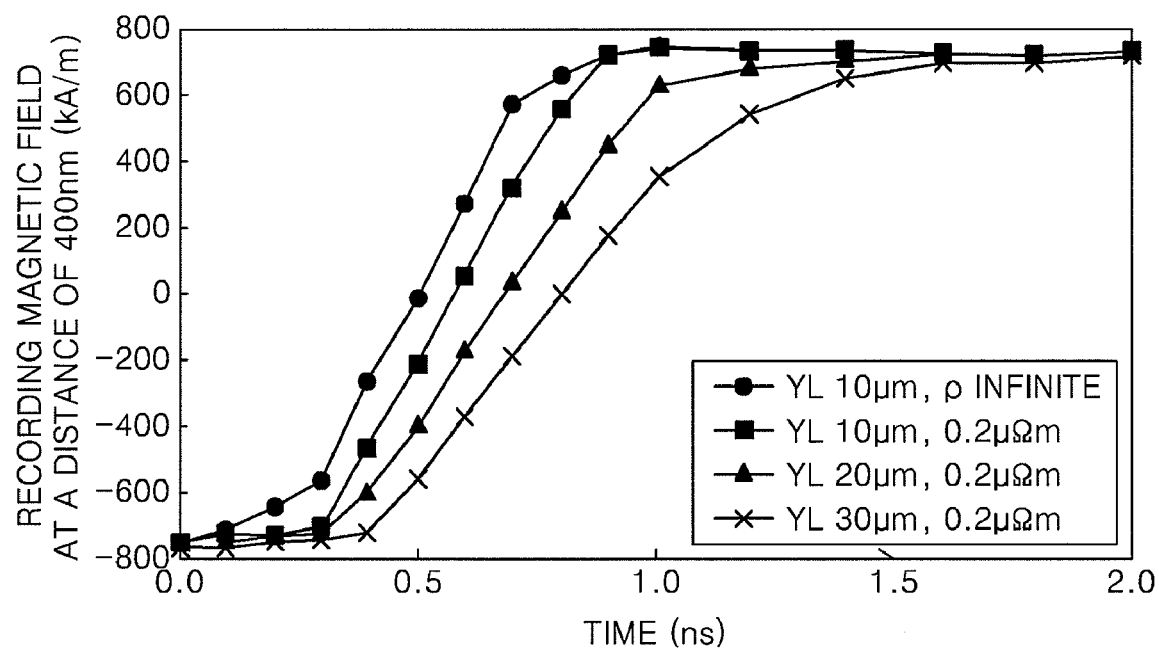
FIG. 4 is a graph showing the rise time of the recording magnetic field according to the length of a return yoke.

In the present exemplary embodiment, the upper wire portion 160 has a double layer structure to reduce the yoke length YL1 so that the eddy current loss at the main pole 140 and the sub-yoke 150 is reduced and the high frequency characteristic of the write head portion W is improved. FIG. 4 shows experiment data on the relationship between the yoke length and the high frequency characteristic of the write head portion W, according to an exemplary embodiment of the present invention. It can be seen that the time for reversing the direction of a recording magnetic field is shortened by increasing the resistivity of the main pole 140 or decreasing the yoke length. In the present exemplary embodiment, by decreasing the yoke length as described above, the rise time of the recording magnetic field is shortened so that the high frequency characteristic of the write head portion W can be improved.

Furthermore, the aspect ratio of the width to the height of the main pole 140 is increased by decreasing the yoke length YL1. Thus, a shape anisotropy effect in a widthwise direction of the main pole 140 is improved so that the magnetic domain of the main pole 140 can be easily formed in the widthwise direction of the main pole 140. The height of the main pole 140 signifies the length of the main pole 140 in a direction perpendicular to the air bearing surface S. The width of the main pole 140 signifies the width of the main pole 140 in a direction perpendicular to the height of the main pole 140.

Figure 5:
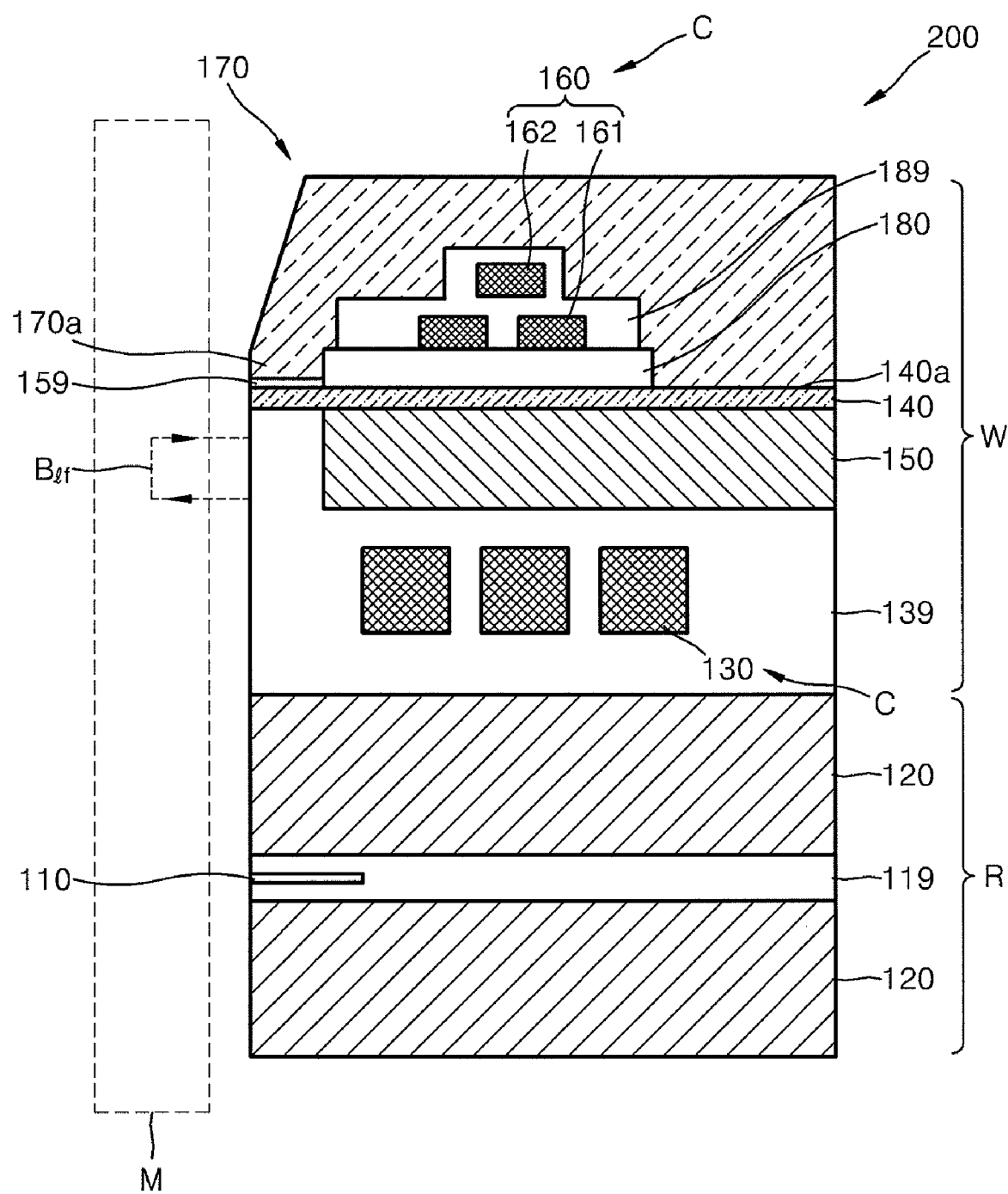
FIG. 5 is a cross-sectional view showing the structure of a perpendicular magnetic recording head according to another exemplary embodiment of the present invention.

FIG. 5 is a cross-sectional view showing the structure of a perpendicular magnetic recording head 200 according to another exemplary embodiment of the present invention. Referring to FIG. 5, the perpendicular magnetic recording head 200 is different from the perpendicular magnetic recording head 100 according to the previous exemplary embodiment of FIG. 1 only in terms of the positions of the main pole 140 and the sub-yoke 150. The sub-yoke 150 is formed on a lower surface of the main pole 140. By decreasing the yoke length, the perpendicular magnetic recording head 200 having an improved high frequency characteristic is embodied.

Figure 6:
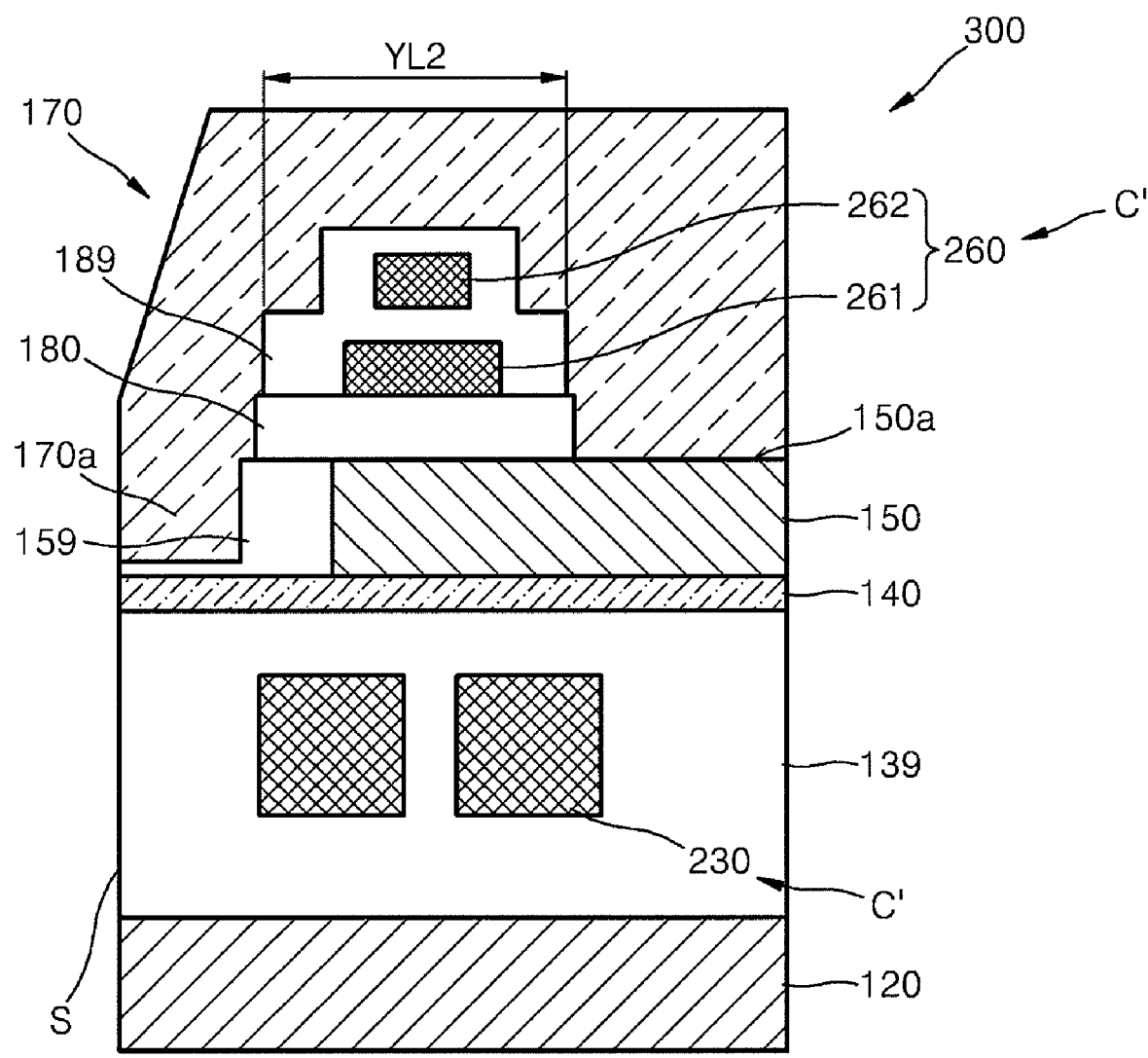
FIG. 6 is a cross-sectional view showing the structure of a perpendicular magnetic recording head according to another exemplary embodiment of the present invention.

FIG. 6 is a cross-sectional view showing the structure of a perpendicular magnetic recording head 300 according to another exemplary embodiment of the present invention. The perpendicular magnetic recording head 300 according to the present exemplary embodiment is different from the perpendicular magnetic recording head 100 of FIG. 1 only in terms of the structure of the coil C'; otherwise the perpendicular magnetic recording head 300 is substantially the same as that of the perpendicular magnetic recording head 100 of FIG. 1, and thus only the differences will be described.

Referring to FIG. 6, the perpendicular magnetic recording head 300 according to the present exemplary embodiment includes the main pole 140, the solenoid type coil C' to which current for generating an induced magnetic field is applied, and the return yoke 170 forming a magnetic path of the magnetic field with the main pole 140. The perpendicular magnetic recording head 300 may further include the sub-yoke 150 to help a magnetic flux condense at the end tip of the main pole 140 toward the recording medium M. Also, the read head portion (not shown) to read information recorded on the recording medium M may be further provided at the side of the magnetic shield layer 120. The perpendicular magnetic recording head 300 further includes the insulation layers 139, 159, 180, and 189 which are formed of, for example, $Al_2O_3$ or other insulation materials.

The coil C' includes a lower wire portion 230 of a single layer structure passing under the main pole 140, an upper wire portion 260 of a double layer structure passing above the main pole 140 and the sub-yoke 150, and connection portion (not shown). The lower wire portion 230, the upper wire portion 260, and the connection portion make a solenoid structure by encompassing the main pole 140 and the sub-yoke 150. The lower wire portion 230 includes two lower wires. The upper wire portion 260 includes two layers of upper wire layers 261 and 262 each having an upper wire. Thus, the coil C' of the present exemplary embodiment has a 2-turn solenoid structure.

The cross-sectional area of the upper wire portion 260 is smaller than that of the lower wire portion 230. Thus, the cross-sectional area of each of the upper wires is smaller than that of each of the lower wires. By sufficiently increasing the cross-sectional area of the lower wire portion 230, the increase in resistance of the upper wire portion 260 due to the decrease in the cross-sectional area of the upper wire portion 260 can be offset. A yoke length YL2 can be reduced by making the number of turns of coils two and the upper wire portion 260 into a double layer structure. Furthermore, by decreasing the cross-sectional area of the upper wire portion 260 to be smaller than that of the lower wire portion 230, the yoke length YL2 can be further decreased. Accordingly, by reducing the yoke length YL2, the high frequency characteristic of the perpendicular magnetic recording head 300 can be improved. Also, a shape anisotropy effect in the widthwise direction can be improved by increasing an aspect ratio of the width to the height of the main pole 140.

The length of the second upper wire layer 262 is smaller than that of the first upper wire layer 261 as seen from a cross-sectional view perpendicular to the air bearing surface S. Further, the second upper wire layer 262 is preferably arranged in the middle, above the first upper wire layer 261 to reduce the length of the magnetic path formed by the main pole 140, the sub-yoke 150, and the return yoke 170 and simultaneously prevent the degradation of the characteristics of a magnetic flux flowing in the return yoke 170, which is a magnetic film placed on the upper wire portion 260 due to a sharp inclination or step.

Since the perpendicular magnetic recording head 300 according to the present exemplary embodiment has a yoke length YL2 that is short, the upper wire portion 260 can be arranged toward the air bearing surface S. For example, when the upper wire portion 260 is formed in two layers, the upper wire portion 260 can be arranged within about 5 μm from the air bearing surface S using a conventional photolithography technique. Thus, recording efficiency can be maximized.

Figure 7:
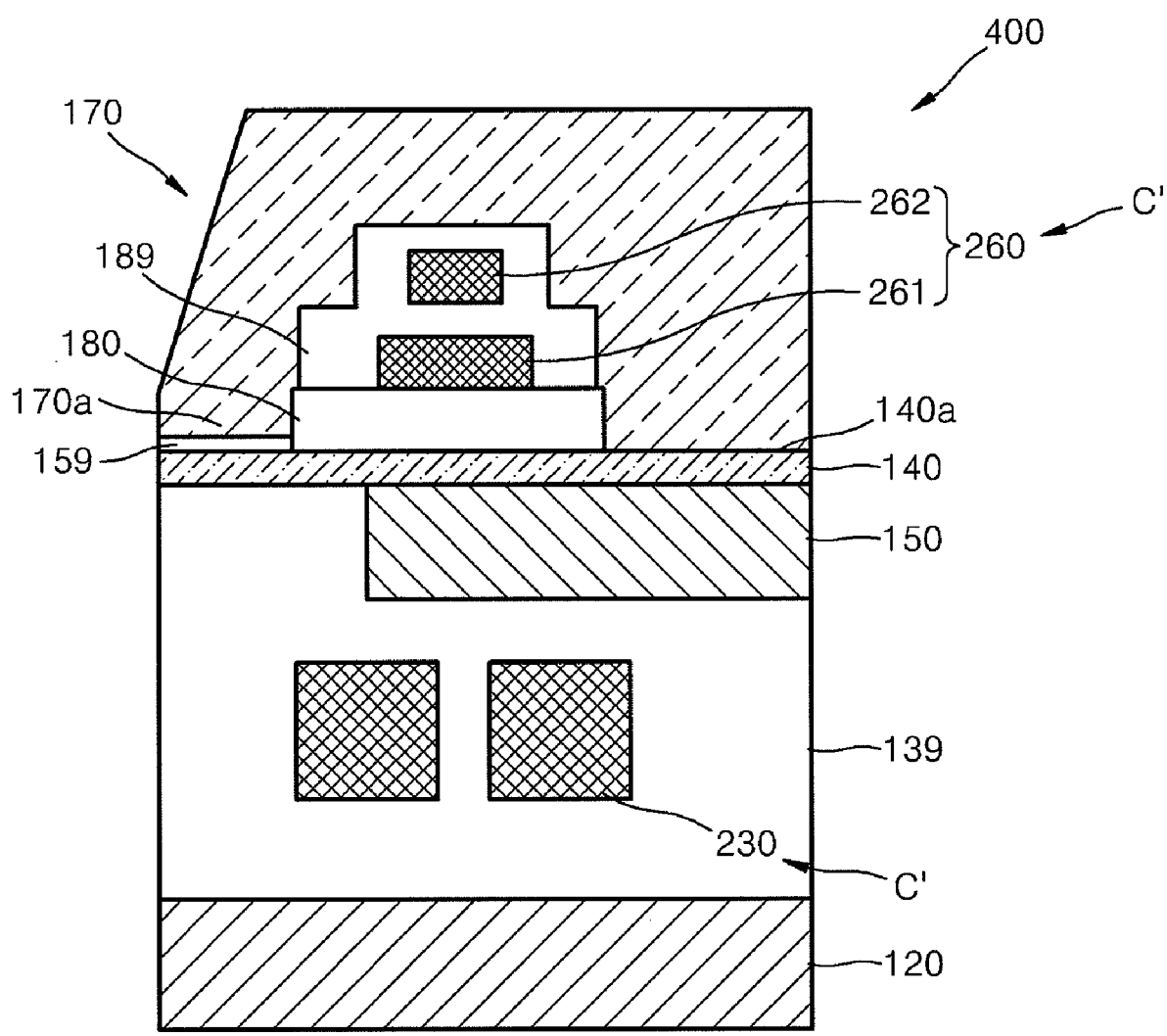
FIG. 7 is a cross-sectional view showing the structure of a perpendicular magnetic recording head according to another exemplary embodiment of the present invention.

FIG. 7 is a cross-sectional view showing the structure of a perpendicular magnetic recording head 400 according to another exemplary embodiment of the present invention. Referring to FIG. 7, the perpendicular magnetic recording head 400 according to the present exemplary embodiment is different from the perpendicular magnetic recording head 300 of FIG. 6 only in terms of the positions of the main pole 140 and the sub-yoke 150. That is, the sub-yoke 150 is formed on a lower surface of the main pole 140. By decreasing the yoke length, the perpendicular magnetic recording head 400 having an improved high frequency characteristic is embodied.

In a method of manufacturing a perpendicular magnetic recording head according to the present invention, although the structure of the perpendicular magnetic recording head according to each of the exemplary embodiments is slightly modified, since the manufacturing method is substantially the same. Therefore, a method of manufacturing the perpendicular magnetic recording head 100 of FIG. 1 will be mainly described.

FIGS. 8A-8H illustrate the operations of the method of manufacturing the perpendicular magnetic recording head 100 according to an exemplary embodiment of the present invention. In each of FIGS. 8A-8H, a lower drawing illustrates a partial cross-sectional view taken along line B-B of an upper drawing.

Figure 8A:
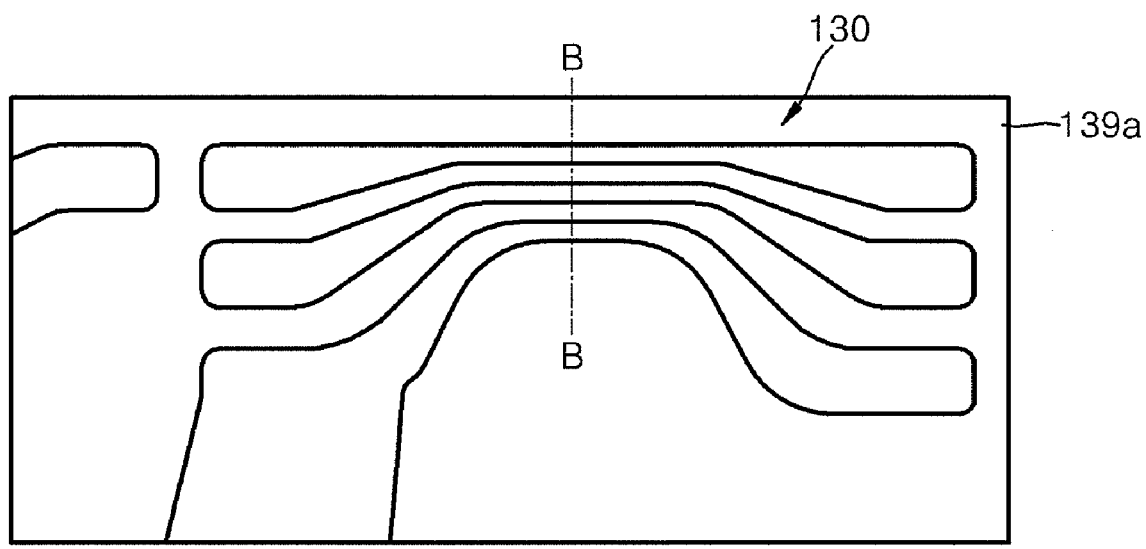
FIGS. 8A-8H illustrate the operations of a method of manufacturing a perpendicular magnetic recording head according to an exemplary embodiment of the present invention.
Figure 8A:
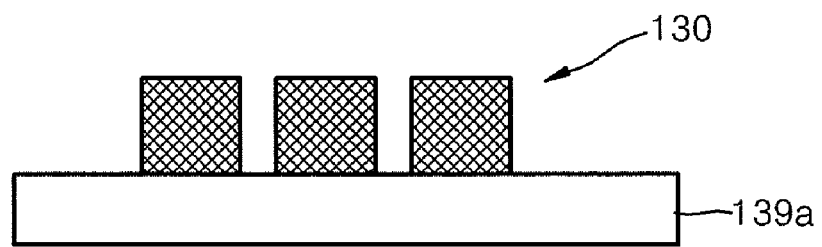

FIG. 8A illustrates the structure of the lower wire portion 130 of the coil. Referring to FIG. 8A, a first lower insulation layer 139a is formed on a magnetic shield layer (not shown) and the lower wire portion 130 is formed thereon. The first lower insulation layer 139a can be formed in a method of depositing an insulation material such as $Al_2O_3$ or $AiO_2$ or spin coating and baking photoresist. For example, the lower wire portion 130 can be formed by depositing a seed layer over the entire area of the first lower insulation layer 139a, patterning according to the shape of the lower wire portion 130, and plating with copper (Cu).

Figure 8B:
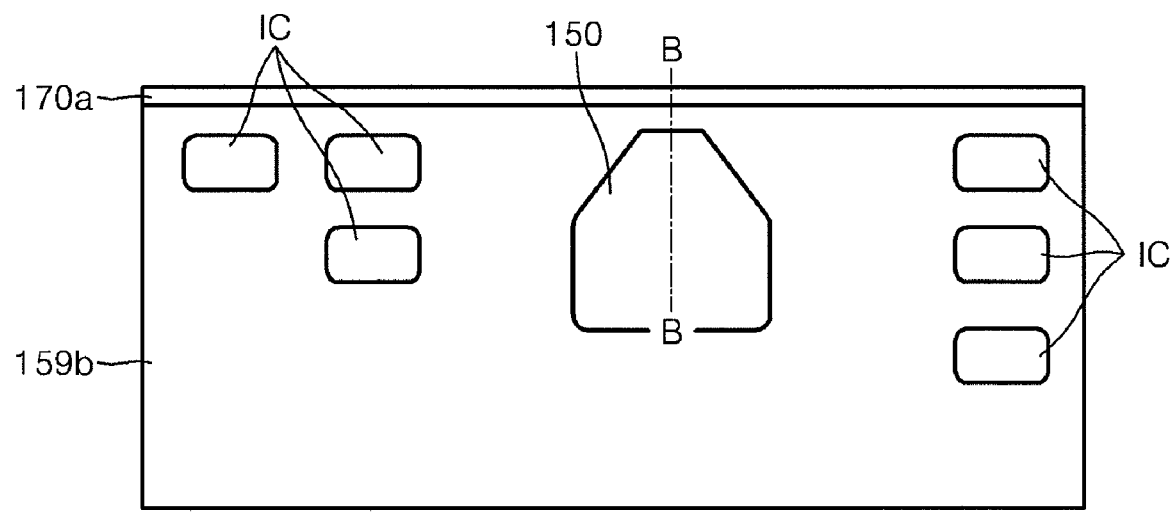
Figure 8B:
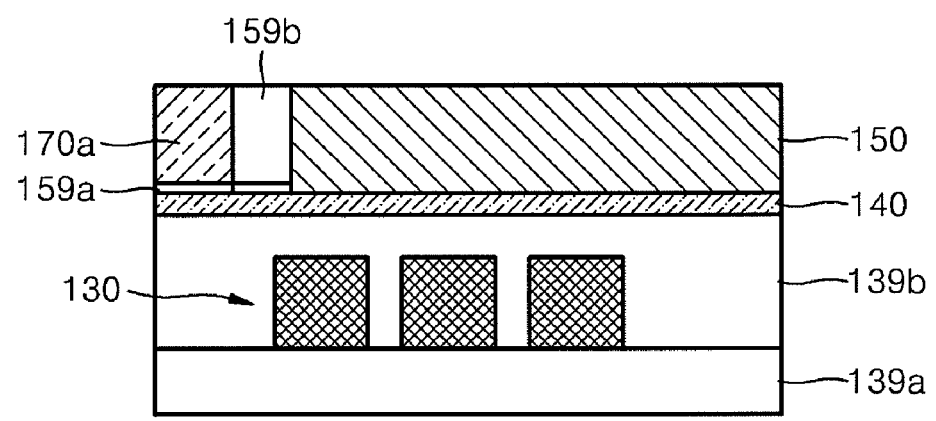
Figure 8C:
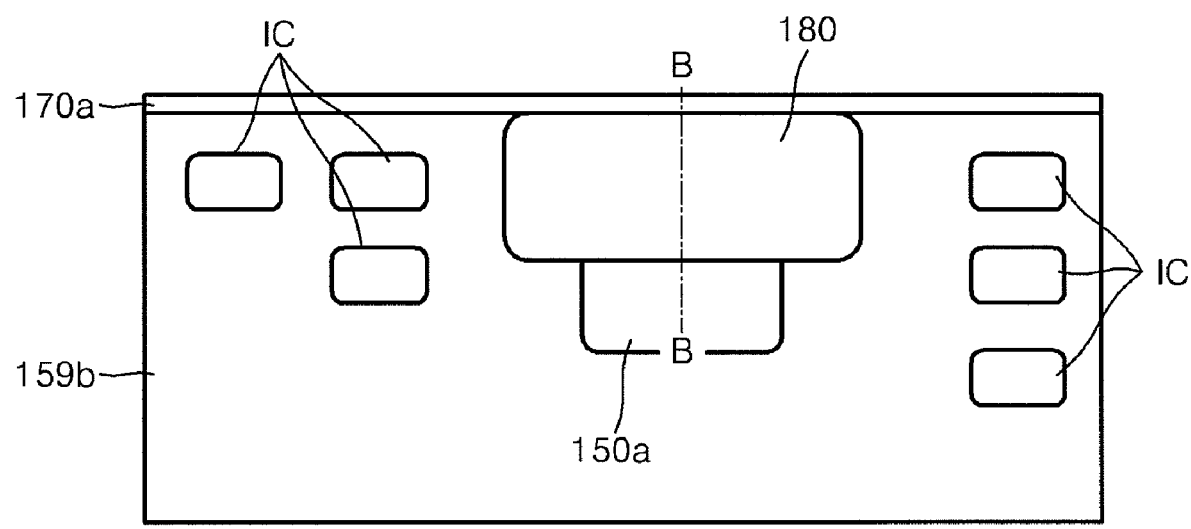
Figure 8C:
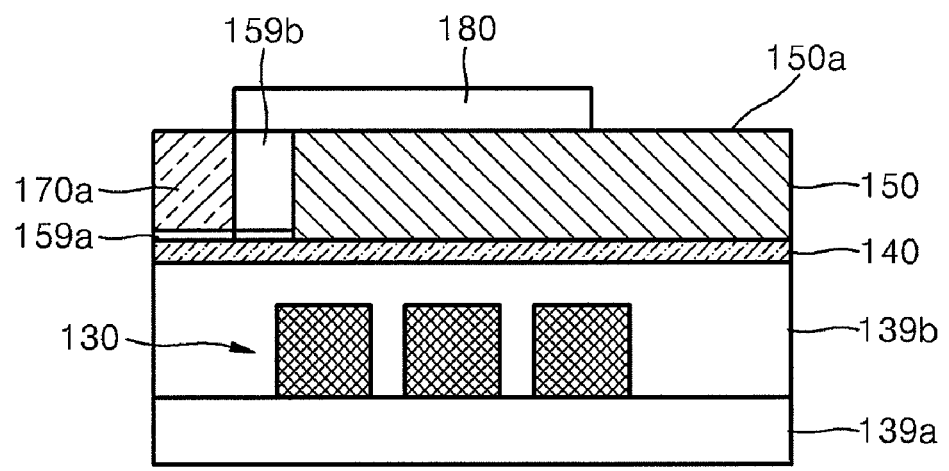

Then, FIGS. 8B and 8C illustrate the operations of forming the connection portion of the coil. Referring to FIG. 8B, a connection portion IC for the electric connection to the upper wire portion 160 is formed in the subsequent operation at an end tip of the lower wire portion 130. In the forming of the connection portion IC, the seed layer, used for forming the lower wire portion 130, can be used as the seed layer for forming the connection portion. That is, the connection portion IC is patterned again to expose only the shape of the connection portion IC at the end portion of the lower wire portion 130 and plated with copper. Then, the unnecessary seed layer is removed using an ion beam etching equipment. Then, a first upper insulation layer 139b is formed on the upper surface of the lower wire portion 130. The first upper insulation layer 139b is penetrated by the connection portion IC, and the first upper insulation layer 139b can be formed in the same method used for a first lower insulation layer 139a. For example, the first upper insulation layer 139b can be formed by depositing an insulation material such as $Al_2O_3$ and planarizing the same through a chemical mechanical polishing (CMP) process.

Then, the main pole 140 is formed on the first upper insulation layer by depositing or plating a magnetic material having a saturation magnetization, such as CoFe and CoNiFe. For example, the process of forming the main pole 140 includes a seed layer deposition process, a photolithography process, a plate process, and a process to remove unnecessary magnetic film.

Then, a second lower insulation layer 159a is formed in a portion at an end tip of the upper surface of the main pole 140. The second lower insulation layer 159a can be formed of an insulation material such as $Al_2O_3$ or $SiO_2$ and a deposition process such as ALD (atomic layer deposition) is employed. The side where the second lower insulation layer 159a is formed faces a recording medium (not shown). The second lower insulation layer 159a is a gap layer between the main pole 140 and the return yoke tip 170a.

Then, the return yoke tip 170a is formed in a portion at an end tip of the second lower insulation layer 159a. The sub-yoke 150 is formed in an area of the upper surface of the main pole 140 where the second lower insulation layer 159a is not formed. The processes of forming the return yoke tip 170a and the sub-yoke 150 are simultaneous. Hence, the return yoke tip 170a and the sub-yoke 150 are formed of a soft magnetic material having a high magnetic permeability, and are formed of the same material or different materials. For Example, NiFe or CoNiFe can be used for forming the return yoke tip 170a and the sub-yoke 150 in a method of plating or deposition.

A second upper insulation layer 159b fills a gap between the return yoke tip 170a and the sub-yoke 150. The second upper insulation layer 159b can be formed over the entire area of the first upper insulation layer 139b. After the second upper insulation layer 159b is formed, the upper surface of the second upper insulation layer 159b can be planarized in a CMP method. The second upper insulation layer 159b is penetrated by the connection portion IC.

Figure 8D:
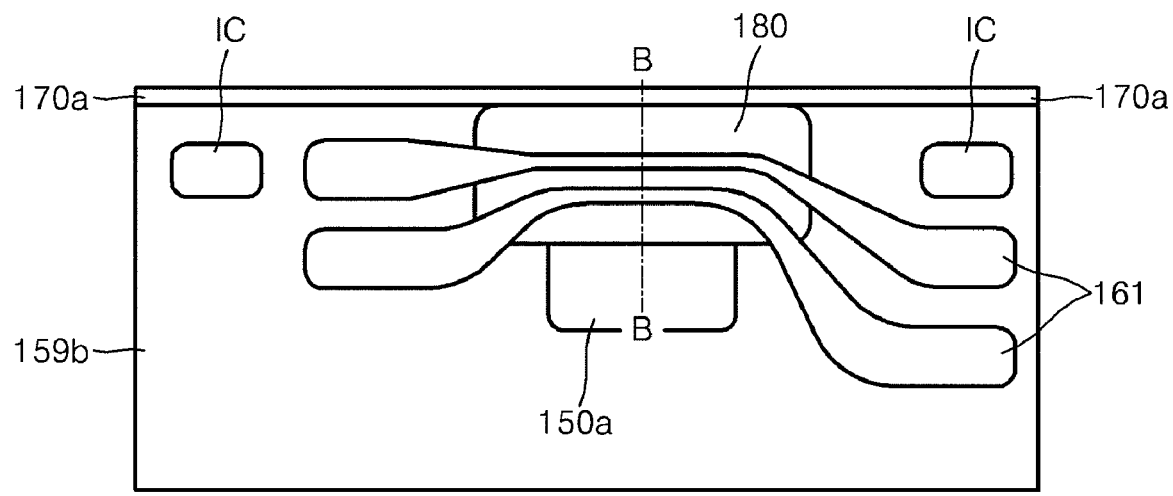
Figure 8D:
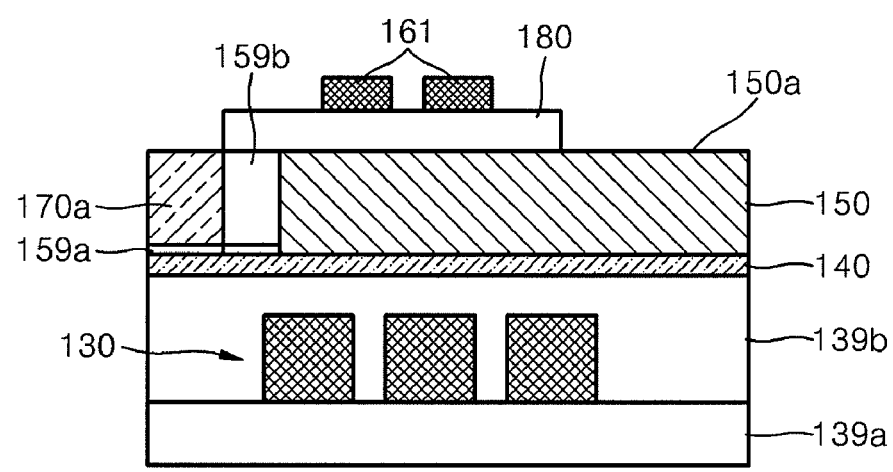

As shown in FIG. 8C, the third insulation layer 180 is formed on the upper surface of the sub-yoke 150 as insulation between the sub-yoke 150 and the first upper wire layer 161 of FIG. 8D. The third insulation layer 180 is formed such that the back gap 150a and the connection portion IC are exposed, and the third insulation layer 180 is formed in a method of coating photoresist and hard curing such that the photoresist is cross-linked through a thermal treatment process in which the photoresist is kept in an oven at a temperature over 240° C. for more than 7 hours, or in a method of depositing $Al_2O_3$ using a sputter or a chemical vapor deposition (CVD) and then performing a lift off or etching process.

Then, as shown in FIG. 8D, the first upper wire layer 161 is formed on the third insulation layer 180 by forming a seed layer on the third insulation layer 180, patterning the same, and plating a material exhibiting a superior conductivity such as copper.

Figure 8E:
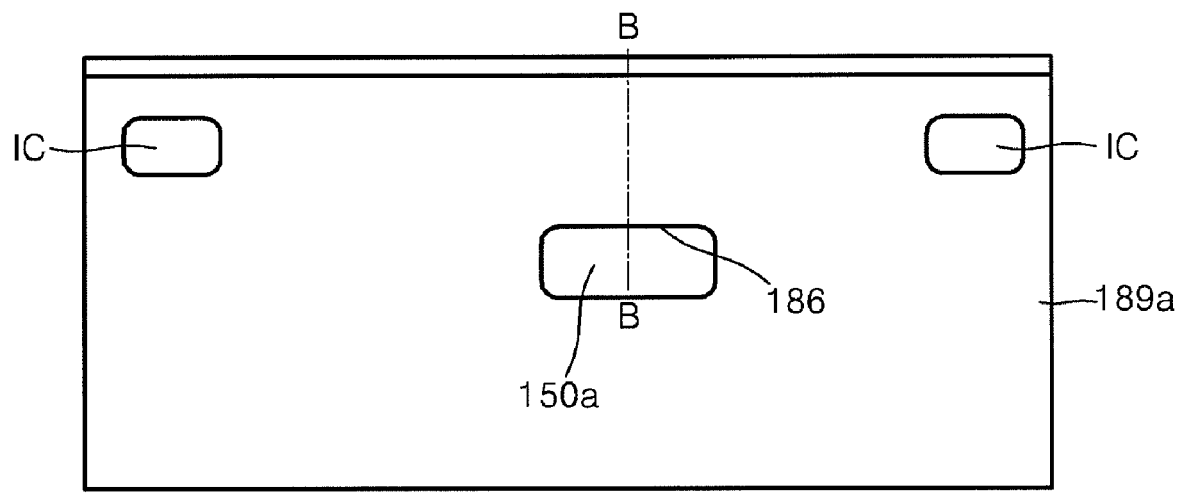
Figure 8E:
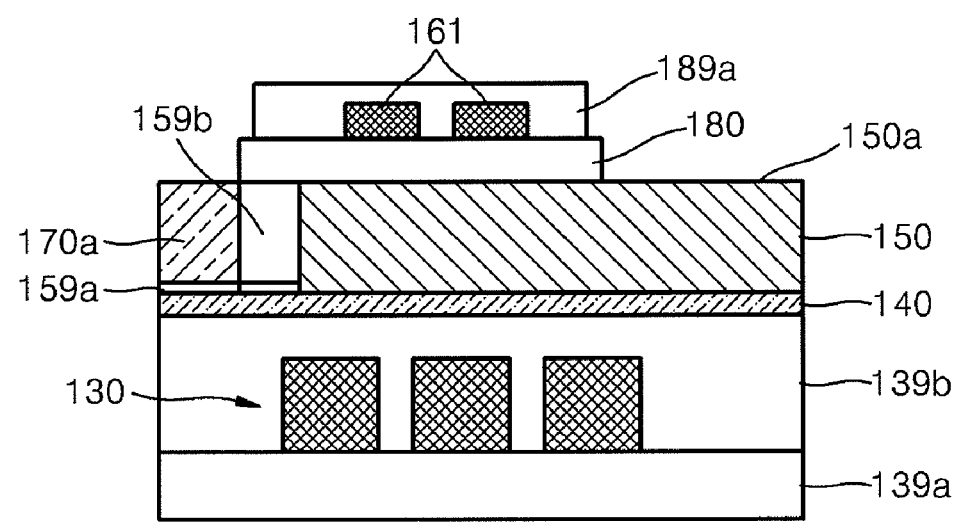

Then, as shown in FIG. 8E, a fourth lower insulation layer 189a covering the upper and side surfaces of the first upper wire layer 161 is formed on the top surface of the third insulation layer 180. A through hole 186 is formed in the fourth lower insulation layer 189a to expose the back gap 150a of the sub-yoke 150. The connection portion IC, electrically connecting the lower wire portion 130 and the first upper wire layer 161 to the second upper wire layer 162 that is formed on the upper surface of the fourth lower insulation layer 189a, is formed to penetrate the fourth lower insulation layer 189a. The fourth lower insulation layer 189a is formed to insulate the first upper wire layer 161 from the second upper wire layer 162 by depositing a material such as $Al_2O_3$. The thickness of the fourth lower insulation layer 189a is preferably, but not necessarily a minimum within a range needed for insulation.

Figure 8F:
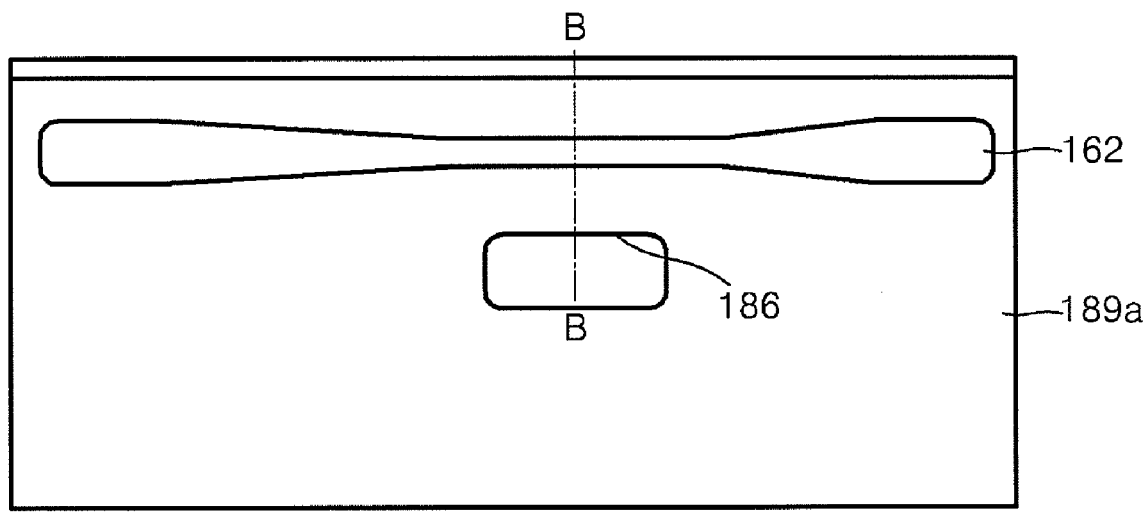

Referring to FIG. 8F, the second upper wire layer 162 is formed across the upper surface of the fourth lower insulation layer 189a. The second upper wire layer 162 is arranged above an area where the first upper wire layer 161 is placed. The second upper wire portion 162 can be formed through a process of plating a material exhibiting a superior conductivity such as copper.

The upper wires forming the first and second upper conductive layers 161 and 162 are preferably formed such that portions passing over the main pole 140 are adjacent to the end tip of the main pole 140. Furthermore, the upper wires forming the first and second upper wire layers 161 and 162 are preferably formed such that the widths of the middle portions passing above the main pole 140 are smaller than the widths of outer portions passing above the main pole 140.

Figure 8G:
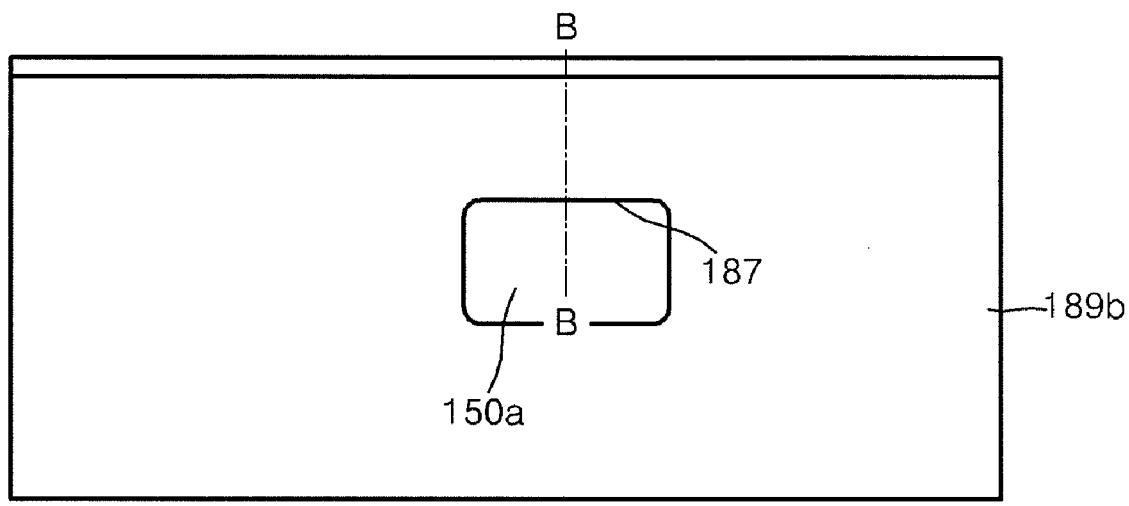
Figure 8G:
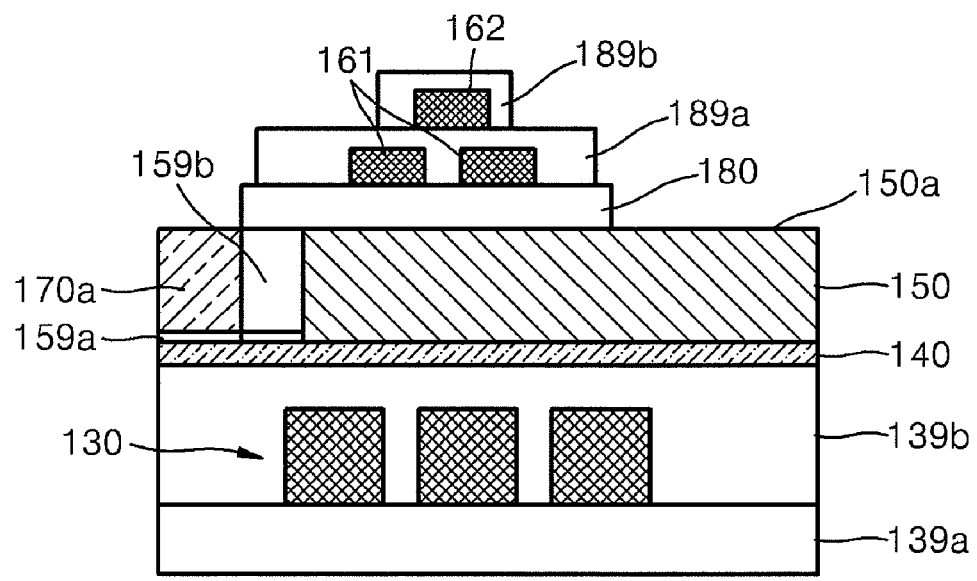
Figure 8H:
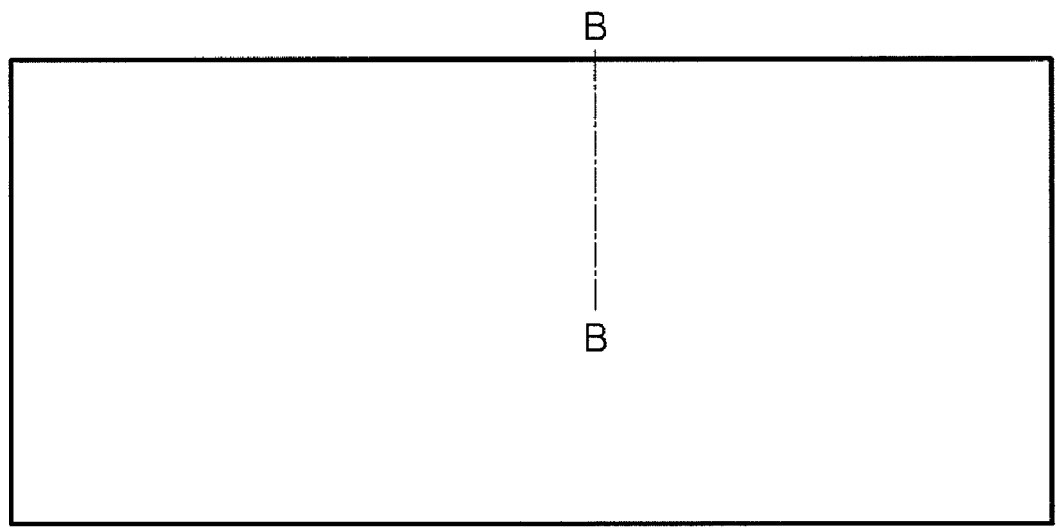
Figure 8H:
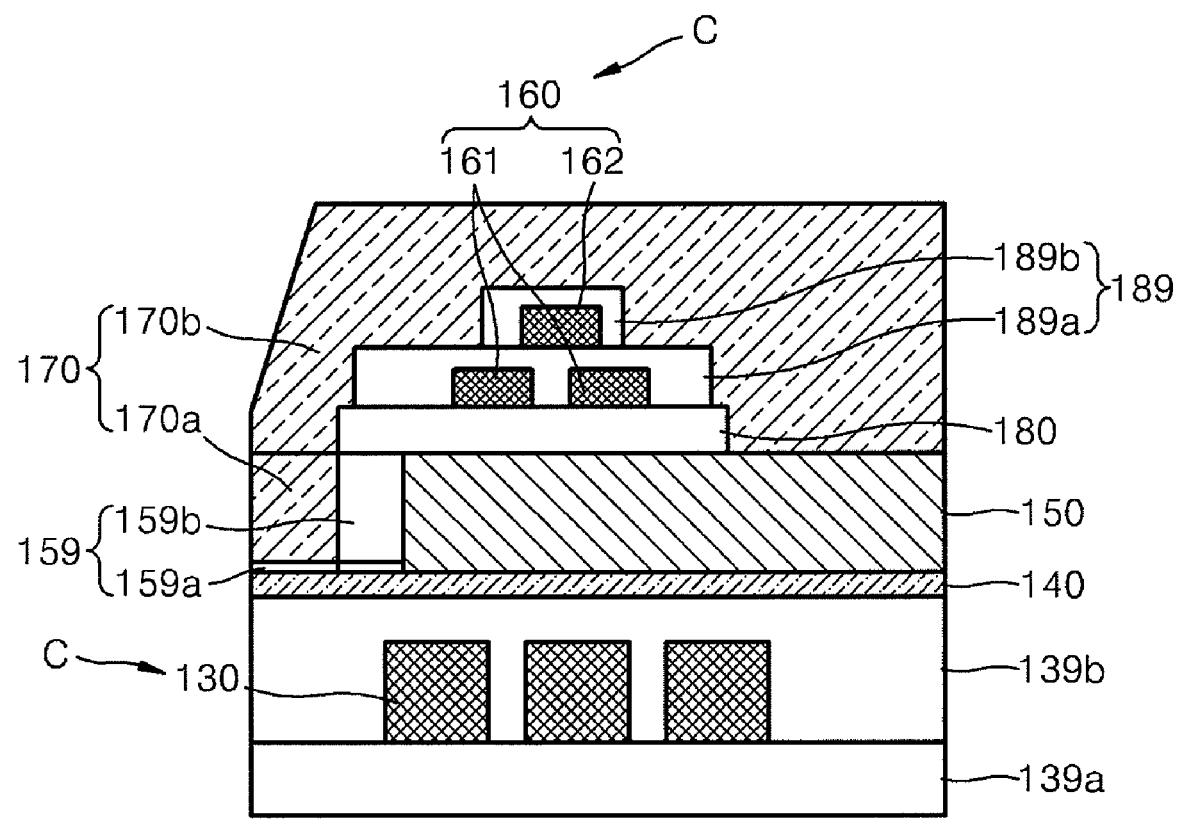

As shown in FIG. 8G, a fourth upper insulation layer 189b covering the second upper wire layer 162 is formed on the top surface of the fourth lower insulation layer 189a. The fourth upper insulation layer 189b can be formed, for example, by coating photoresist and baking the same or depositing $Al_2O_3$. Then, as shown in FIG. 8H, the return yoke 170 is formed over the return yoke tip 170a, the fourth lower and upper insulation layers 189a and 189b, and the back gap 150a of the sub-yoke 150. The return yoke 170 can be formed by depositing or plating a magnetic material such as NiFe or CoNiFe, for example.

In particular, the above-described manufacturing method has a feature in the operation of forming a structure of connecting a lower wire layer and an upper wire layer and forming the upper wire layer. The other operations are exemplary and the order of the operations or the detailed contents of the respective operations can be conveniently modified by one skilled in the art. For example, although in the above description a main pole is first formed and then a sub-yoke is formed on the upper surface of the main pole, it is possible that the sub-yoke is first formed and then the main pole is formed on the upper surface of the sub-yoke as illustrated in the perpendicular magnetic recording head 200 and 300.

A perpendicular magnetic recording head having a variety of shapes according to the above-described exemplary embodiments of the present invention and the manufacturing method thereof are described. The present invention is characteristic in that a yoke length is minimized by forming an upper wire portion in a double layer structure, however the present invention is not limited thereto, and thus, the upper wire portion can also be formed in a multi-layer structure. Furthermore, although in the above-described exemplary embodiments a three-turn or two-turn coil is shown, the number of turns is not limited thereto.

The perpendicular magnetic recording head according to the some exemplary embodiments of the present invention and the manufacturing method thereof may have the following advantages. However, it is not necessary that an embodiment of the present invention have these advantages.

First, by reducing the yoke length of the magnetic recording portion, the high frequency characteristic is improved and simultaneously the recording magnetic field strength is improved.

Second, by arranging the coil turns at the end tip portion of the main pole toward the air bearing surface, the recording efficiency can be maximized.

Third, by reducing the yoke length, the aspect ratio of the width to the height of the main pole is increased so that the shape anisotropy effect in the widthwise direction is improved.

While this invention has been particularly shown and described with reference to exemplary embodiments thereof, it will be understood by one skilled in the art that various changes in form and details may be made therein without departing from the spirit and scope of the invention as defined by the appended claims.

What is claimed is:

1. A perpendicular magnetic recording head comprising:
   a main pole;
   a return yoke forming a magnetic path with the main pole; and
   a coil encompassing the main pole in a solenoid structure to allow the main pole to generate a magnetic field that records information on a recording medium,
   wherein, when a side of the main pole toward the return yoke is an upper portion of the main pole and a side of the main pole opposite to the return yoke is a lower portion of the main pole, the coil includes a lower wire portion passing through the lower portion of the main pole, an upper wire portion passing through the upper portion of the main pole, and a connection portion electrically connecting the lower wire portion and the upper wire portion, and the upper wire portion includes an upper wire layer having at least two layers.

2. The perpendicular magnetic recording head of claim 1, wherein the length of the upper wire portion is smaller than that of the lower wire portion as seen from a cross-sectional view perpendicular to an air bearing surface of the perpendicular magnetic recording head facing the recording medium.

3. The perpendicular magnetic recording head of claim 1, wherein the upper wire portion includes a first upper wire layer, which is closer to the main pole than a second upper wire layer and, the length of the second upper wire layer is smaller than that of the first upper wire layer as seen from a cross-sectional view perpendicular to an air bearing surface of the perpendicular magnetic recording head facing the recording medium.

4. The perpendicular magnetic recording head of claim 1, wherein, the upper wire layer has at least two layers, the number of turns of the upper wire portion far from the main pole is not more than that of the upper wire portion close to the main pole.

5. The perpendicular magnetic recording head of claim 1, wherein the cross-sectional area of an upper wire forming the upper wire portion is smaller than that of a lower wire forming the lower wire portion.

6. The perpendicular magnetic recording head of claim 1, wherein the cross-sectional area of the connection portion is larger than that of a lower wire forming the lower wire portion.

7. The perpendicular magnetic recording head of claim 1, wherein the upper wire portion is arranged within 5 μm from an air bearing surface of the perpendicular magnetic recording head facing the recording medium.

8. The perpendicular magnetic recording head of claim 1, wherein the upper wire portion has a double layer structure including a first upper wire layer, which is closer to the main pole than a second upper wire layer and the lower wire portion is a single layer structure.

9. The perpendicular magnetic recording head of claim 8, wherein the first upper wire layer is formed of two upper wires, the second upper wire layer is formed of a single upper wire, and the lower wire portion is formed of three lower wires.

10. The perpendicular magnetic recording head of claim 8, wherein each of the first and second upper wire layers is formed of one upper wire and the lower wire portion is formed of two lower wires.

11. The perpendicular magnetic recording head of claim 1, wherein a sub-yoke is further provided a predetermined distance apart from an end portion of the main pole toward the recording medium to allow a magnetic field to condense at the end portion and the sub-yoke and main pole are encompassed by the coil in a solenoid structure.

12. The perpendicular magnetic recording head of claim 11, wherein the sub-yoke contacts an upper surface of the main pole or a lower surface of the main pole.

13. A method of manufacturing a perpendicular magnetic recording head including a coil encompassing a main pole in a solenoid structure, the method comprising:
    forming a lower wire portion and a connection portion above a magnetic shield layer;
    forming a first magnetic layer having a main pole on the lower wire portion;
    forming a first insulation layer on the first magnetic layer; and
    forming an upper wire portion, that includes a first upper wire portion and a second upper wire portion formed in an upper portion of the first upper wire portion, on the first insulation layer.

14. The method of claim 13, wherein the forming of the lower wire portion and the connection portion comprises:
    forming an insulation layer on the magnetic shield layer;
    forming the lower wire portion on the insulation layer; and
    forming the connection portion on an end portion of the lower wire portion.

15. The method of claim 14, wherein the lower wire portion and the connection portion are formed in a plate process using a seed layer that is used for the forming both the lower wire portion and the connection portion.

16. The method of claim 13, wherein the forming of the upper wire portion comprises:
    forming a first upper wire layer on the first insulation layer;
    forming a second insulation layer encompassing the first upper wire layer; and
    forming a second upper wire layer on the second insulation layer.

17. The method of claim 16, wherein, in the forming of the second upper wire layer, the second upper wire layer is arranged above and in the middle of the first upper wire layer.

18. The method of claim 16, wherein, in the forming of the upper wire portion, portions of upper wires forming the first and second upper wire layers and passing in an upper portion of the main pole are close to an end tip of the main pole.

19. The method of claim 16, wherein, in the forming of the upper wire portion, a plurality of widths of middle portions of upper wires forming the first and second upper wire layers and passing above the main pole are smaller than a plurality of widths of outer portions of upper wires forming the first and second upper wire layers and passing above the main pole.

20. The method of claim 13, wherein the forming of the first magnetic layer comprises:
    forming the main pole on the lower wire portion; and
    forming a sub-yoke having an end portion separated from an end portion of the main pole, wherein the sub-yoke is on an upper surface of the main pole.

21. The method of claim 13, wherein the forming of the first magnetic layer comprises:
    forming a sub-yoke on the lower wire portion; and
    forming the main pole having an end portion separated from an end portion of the sub-yoke, wherein the sub-yoke is on an upper surface of the main pole.

* * * * *